United States Patent Office 3,420,774
Patented Jan. 7, 1969

3,420,774
REGENERATION OF WEAKLY ACIDIC CATION EXCHANGERS CHARGED WITH DETERGENTS
Christian Oehme, Cologne-Buchheim, and Hans Brost, Leverkusen, Germany, assignors to Farbenfabriken Bayer Aktiengesellschaft, Leverkusen, Germany, a corporation of Germany
No Drawing. Filed Mar. 29, 1966, Ser. No. 538,226
Claims priority, application Germany, July 3, 1965, F 46,518
U.S. Cl. 210—30   5 Claims
Int. Cl. B01j 11/02; C02b 1/76; B01d 15/06

ABSTRACT OF THE DISCLOSURE

A process in which non-ionic detergents are desorbed from a weakly acid cation exchanger by means af alkaline aqueous solutions, followed by regeneration of the ion exchanger with dilute aqueous mineral acid.

---

It is known an analytical chemistry that non-ionic detergents such as, for example, alkylphenol polyethylene oxide and abietic acid polyglycol esters, can be separated from anionic detergents by adsorbing them on a weakly acid cation exchanger based on an acrylate resin.

In the $H^+$-form, weakly acid cation exchangers selectively adsorb nonionic detergents, but do not adsorb anion active detergents. Anion active detergents pass the ion-exchanger and are found in the filtrate.

It is also known that the nonionic detergents thus adsorbed by the cation exchanger cannot be completely eluated in a form suitable for quantitative analysis by treating the ion exchanger with acidic aqueous solutions, i.e. by the standard regenerating method. Adsorbed non-ionic detergents may be removed from the weakly acidic ion exchangers only by means of methanolic hydrochloric acid. In this instance, the ion exchanger is eluated and regenerated in one step so that it can directly be re-used to adsorb non-ionic detergents.

Waters, particularly waste waters in which nonionic detergents are present, are often obtained in industrial processes and have to be treated with ion exchangers to remove those nonionic detergents.

This problem arises for instance in the regeneration and recovery of galvanic rinsing waters which are generally recycled and in which nonionic detergents accumulate. This accumulation of detergents in cyclic processes is undesirable. It is possible by means of a filter filled with weakly acid cation exchanger material in the $H^+$-form, generally preceded by an anion exchanger plant, to remove the nonionic detergents. Unfortunately, regeneration of the ion-exchange resin on an industrial scale is attended by serious difficulties. Hydrochloric acid, solved in methanol or acetone, is extremely difficult to handle in large amounts. Aqueous acid solutions are unsuitable to remove the detergents from the ion-exchange resin, as outlined above.

A process for the regeneration of weakly acid cation exchangers charged with nonionic detergents, has now been found wherein the charged ion-exchanger is treated in a first stage with aqueous alkaline solution, and in a second stage with dilute aqueous mineral acids. Suitable weakly acid cation exchangers for the process of this invention are, for example, carboxyl-group-containing cation exchangers based on water-insoluble synthetic polymers, preferably on polymers of the kind which can be obtained by copolymerising acrylic or methacrylic esters in the presence of crosslinking agents such as divinyl benzene, or by the graft polymerisation of acrylic acid or methacrylic acid and their esters on polybutadiene.

The ester groups of these polymers, if any, are preferably split by subsequent hydrolysis. It is also preferred to use so-called macroporous or sponge-like cation exchangers, i.e. cation exchangers based on polymers prepared in the presence of a liquid as the polymerisation medium which dissolves the monomers but does not dissolve or swell the polymers. These ion-exchangers are known per se.

Non-ionic detergents in this invention are all conventional non-ionic detergents. They are described in detail for example in "Organische und anorganische Wasch-, Bleich- und Reinigungsmittel" by C. Lüttgen, Verlag Strabenbau, Chemie und Technik, Heidelberg 1952, pp. 29–32 and pp. 95–99, and in "Angewandte Chemie," vol. 69, No. 8 (1953), pp. 201–224, in particular pp. 209–210, and in the literature listed therein. These pages are incorporated in this specification by reference.

Suitable alkaline aqueous regenerating solutions are, for example, 1 to 10% solutions of ammonia, alkali-metal hydroxides (sodium hydroxide, potassium hydroxide), alkali-metal carbonates (soda, potassium carbonate), alkali-metal bicarbonates (sodium-hydrogen carbonate), alkali-metal phosphates (secondary sodium phosphate, tertiary sodium phosphate).

Examples of aqueous mineral acids suitable in the process according to the invention are 1 to 10% sulphuric acid and hydrochloric acid.

The process according to the invention may be generally carried out as follows:

The weakly acidic ion exchanger charged with the nonionic detergent is treated with from 2 to 4 parts by volume, based on the quantity of exchanger, of one of the aforementioned alkaline regenerating agents, after which the regenerating agent is flushed with approximately 2 to 5 parts by volume of water, based on the quantity of exchanger. In this step the non-ionic detergents are removed and the ion-exchanger transformed into its salt form. The exchanger is then converted into the $H^+$-form with from 2 to 4 parts by volume, based on the quantity of exchanger, of the said mineral acid solution. It is preferred to leave the alkaline regenerating agent in contact with the exchanger for a certain time, up to about 2 hours, before it is flushed with water.

The invention is illustrated by the following example.

EXAMPLE 800 parts by volume of a water containing 50 mg. per litre of a nonylphenol polyglycol ether as non-ionic detergent, were passed over 1 part by volume of a weakly acid cation exchanger (in the form of a copolymer of 92% methyl acrylate and 8% divinyl benzene, prepared in heptane and subsequently hydrolysed) in the $H^+$-form. The detergent is adsorbed to a level of around 95%, in spite of which there are no signs of failure. The resin thus charged was then mixed, divided and regenerated with the following regenerating agents (2 parts by volume per 1 part by volume of resin in each instance). The detergent present in the eluate was quantitatively determined:

|  | G. of detergent per litre of exchanger |
|---|---|
| Ammonium hydroxide, 4% | 40.3 |
| Soda lye, 4% | 39.2 |
| Common salt, 5% | No effect |
| Hydrochloric acid, 3% | 0.2 |
| Methanol | 37 |
| Soda, 5% | 32 |
| Na-bicarbonate, 8% | 29 |

The exchanger was then washed out with 5 parts by volume of water, converted back into the $H^+$-form with 3 parts by volume of 3% hydrochloric acid and used for the next charging cycle.

We claim:

1. A process for regenerating a weakly acidic cation-exchanger charged with a non-ionic detergent, said process comprising the steps of treating said charged ion-exchanger with an aqueous alkaline solution, flushing the exchanger with water and regenerating said ion-exchanger with a dilute aqueous mineral acid solution.

2. The process of claim 1 wherein said weakly acidic cation-exchanger is a carboxyl-group-containing water-insoluble synthetic polymer.

3. The process of claim 1 wherein said aqueous alkaline solution is about a 1–10% aqueous solution of a compound selected from the group consisting of ammonia, alkali metal hydroxide, alkali metal carbonate, alkali metal bicarbonate and alkali metal phosphate in an amount of about 2–4 parts by volume based on the volume of ion-exchanger.

4. The process of claim 1 wherein said dilute aqueous mineral acid solution is about a 1–10% solution of a member selected from the group consisting of sulphuric and hydrochloric acid in an amount of about 2–4 parts by volume based on the volume of the ion-exchanger.

5. The process of claim 1 wherein the cation exchanger is a copolymer of about 92% methyl acrylate and 8% divinyl benzene, prepared in heptane and hydrolyzed; and the alkaline solution is a member selected from the group consisting of ammonium hydroxide, soda lye and sodium bicarbonate.

References Cited
UNITED STATES PATENTS 3,275,548    9/1966    Walters _____ 210—24
3,305,306    2/1967    Morawe _____ 210—30 X REUBEN FRIEDMAN, *Primary Examiner.*

U.S. Cl. X.R.

210—38; 252—411